(12) United States Patent
Szelest et al.

(10) Patent No.: US 11,954,252 B2
(45) Date of Patent: Apr. 9, 2024

(54) COMPONENT CONNECTION VERIFICATION DEVICE AND METHOD

(71) Applicant: Aptiv Technologies AG, Schaffhausen (CH)

(72) Inventors: Marcin Szelest, Dublin (IE); Pawel Skruch, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 480 days.

(21) Appl. No.: 17/169,315

(22) Filed: Feb. 5, 2021

(65) Prior Publication Data
US 2021/0271323 A1 Sep. 2, 2021

(30) Foreign Application Priority Data
Feb. 27, 2020 (EP) .................................. 20159891

(51) Int. Cl.
*G06F 3/01* (2006.01)
*A41D 19/00* (2006.01)
(Continued)

(52) U.S. Cl.
CPC ......... *G06F 3/014* (2013.01); *A41D 19/0027* (2013.01); *G01H 1/00* (2013.01);
(Continued)

(58) Field of Classification Search
CPC ...... G06F 3/014; A41D 19/0027; G01H 1/00; G09B 5/065; G10L 21/0208; G10L 25/30;
(Continued)

(56) References Cited

U.S. PATENT DOCUMENTS 3,681,686 A 8/1972 Connally
3,891,811 A 6/1975 Miller
(Continued)

FOREIGN PATENT DOCUMENTS

CN 105051989 A 11/2015
CN 107107285 A 8/2017
(Continued)

OTHER PUBLICATIONS

"Foreign Office Action", CN Application No. 202110216366.2, dated Nov. 7, 2022, 20 pages.
(Continued)

*Primary Examiner* — Phuong H Nguyen
(74) *Attorney, Agent, or Firm* — Harness, Dickey & Pierce, P.L.C.

(57) ABSTRACT

A device for verifying the connection of components by a gripper, wherein connecting two or more components produces a connection sound. The device comprises a plurality of audio sensors, a fastener for securing the plurality of audio sensors at different positions on the gripper, and a controller. The controller comprises an input for receiving the audio signals from the plurality of audio sensors, a neural network for isolating the connection sound from the audio signals received from the plurality of audio sensors using independent component analysis based on training audio data obtained from audio signals received during a plurality of training connections made in a controlled environment; and an output for indicating a desired connection status based on the isolated connection sound.

17 Claims, 2 Drawing Sheets

(51) Int. Cl.
*G01H 1/00* (2006.01)
*G09B 5/06* (2006.01)
*G10L 21/0208* (2013.01)
*G10L 25/30* (2013.01)
*H01R 13/64* (2006.01)

(52) U.S. Cl.
CPC .......... *G09B 5/065* (2013.01); *G10L 21/0208* (2013.01); *G10L 25/30* (2013.01); *H01R 13/64* (2013.01); *G10L 2021/02087* (2013.01)

(58) Field of Classification Search
CPC .......... G10L 2021/02087; H01R 13/64; H01R 13/641; H01R 43/26; H01R 13/502; G01N 2291/2697; G01N 29/14; G01N 29/226; G01N 29/4481; B60R 16/0207; G01R 31/69
See application file for complete search history.

(56) References Cited

U.S. PATENT DOCUMENTS

| | | | |
|---|---|---|---|
| 4,506,210 | A | 3/1985 | Chase |
| 4,937,519 | A | 6/1990 | Fields, III |
| 4,951,385 | A | 8/1990 | Desanto |
| 4,959,792 | A | 9/1990 | Sullivan |
| 5,260,659 | A | 11/1993 | Flowerdew et al. |
| 5,280,251 | A | 1/1994 | Strangio |
| 5,361,029 | A | 11/1994 | Rider et al. |
| 5,420,512 | A | 5/1995 | Spillane et al. |
| 5,483,169 | A | 1/1996 | Despain et al. |
| 5,557,651 | A | 9/1996 | Wissman |
| 5,570,010 | A | 10/1996 | Jin et al. |
| 6,282,265 | B1 | 8/2001 | Lowell et al. |
| 6,448,778 | B1 | 9/2002 | Rankin |
| 8,552,709 | B2 | 10/2013 | McCasland et al. |
| 9,813,810 | B1* | 11/2017 | Nongpiur ................ G06N 3/08 |
| 10,492,008 | B2* | 11/2019 | Xu ........................ H04R 25/507 |
| 10,996,286 | B2 | 5/2021 | Schmier et al. |
| 11,062,725 | B2* | 7/2021 | Variani ................ G10L 21/028 |
| 2002/0171434 | A1 | 11/2002 | Stanford et al. |
| 2004/0066202 | A1 | 4/2004 | Pereira et al. |
| 2005/0110500 | A1 | 5/2005 | Hoyte et al. |
| 2006/0043976 | A1 | 3/2006 | Gervais |
| 2007/0030014 | A1 | 2/2007 | Pandya et al. |
| 2009/0289616 | A1 | 11/2009 | Suozzo et al. |
| 2010/0281684 | A1 | 11/2010 | Selbach |
| 2011/0313708 | A1 | 12/2011 | Jin et al. |
| 2013/0018624 | A1 | 1/2013 | Bhatnagar et al. |
| 2013/0049731 | A1 | 2/2013 | Mathis et al. |
| 2014/0292349 | A1 | 10/2014 | Lussier |
| 2014/0327539 | A1 | 11/2014 | Cudak et al. |
| 2015/0073967 | A1 | 3/2015 | Katsuyama |
| 2016/0356836 | A1 | 12/2016 | Horan |
| 2017/0102424 | A1* | 4/2017 | Maalouf .............. H01R 13/502 |
| 2018/0276321 | A1 | 9/2018 | Angelico et al. |
| 2018/0302738 | A1 | 10/2018 | Censo et al. |
| 2019/0120889 | A1 | 4/2019 | Carcia |
| 2019/0310298 | A1 | 10/2019 | Bottman |
| 2021/0270912 | A1 | 9/2021 | Szelest et al. |
| 2021/0274649 | A1 | 9/2021 | Szelest et al. |

FOREIGN PATENT DOCUMENTS

| | | |
|---|---|---|
| CN | 108140989 A | 6/2018 |
| CN | 108140990 A | 6/2018 |
| CN | 109470974 | 3/2019 |
| DE | 10019860 | 10/2001 |
| DE | 10308403 | 9/2004 |
| DE | 102016213536 | 1/2018 |
| EP | 2075883 | 7/2009 |
| EP | 2910430 | 8/2015 |
| EP | 3229496 | 10/2017 |
| EP | 3460495 | 3/2019 |
| EP | 3582511 | 12/2019 |
| JP | 3640150 B2 | 4/2005 |
| JP | 2008226506 | 9/2008 |
| JP | 4920191 | 4/2012 |
| KR | 20100120176 A | 11/2010 |
| KR | 20120101873 A | 9/2012 |
| WO | 0179871 | 10/2001 |
| WO | 2015053936 | 4/2015 |
| WO | 2016090342 | 6/2016 |
| WO | 2017062124 | 4/2017 |
| WO | 2019025113 | 2/2019 |
| WO | 2019187349 | 10/2019 |

OTHER PUBLICATIONS

"Extended European Search Report", EP Application No. 20159893.5, dated Aug. 17, 2020, 10 pages.

"Extended European Search Report", EP Application No. 20159896.8, dated Oct. 2, 2020, 10 pages.

Kirk, "Cognitive Software Defined Radar: A Reactive Approach to RFI Avoidance", Apr. 2018, 6 pages.

"Extended European Search Report", EP Application No. 20159891.9, dated Aug. 19, 2020, 10 pages.

* cited by examiner

COMPONENT CONNECTION VERIFICATION DEVICE AND METHOD

CROSS-REFERENCE TO RELATED APPLICATION

This application claims priority to European Patent Application Number 20159891.9, filed Feb. 27, 2020, the disclosure of which is hereby incorporated by reference in its entirety.

INTRODUCTION

The present disclosure relates to a device and method for verifying the connection of two or more components. In particular, the present disclosure concerns assuring that connected components are correctly mated. The present disclosure is particularly suited to the field of electronic circuit assembly and the connection of wiring harnesses.

BACKGROUND

In some situations, it can be difficult to ensure that components are correctly connected during the manufacture of an assembly. This is often a particular issue in the case of electronic components, such as the connection of a wire harness and other pin and socket terminals. Specifically, the failure to correctly mate a connecting pin with its corresponding socket will typically result in the circuitry not functioning properly and/or may decrease its overall reliability. Furthermore, the fault may not become apparent until after all the components have been assembled.

Conventional electrical connectors may sometimes be provided with a mating mechanism, such as a latch, which latches two components together once they are correctly engaged into one another. The latching mechanism may also produce a mechanical vibration which can be received as an audible indicator, such as a click, when the latch has engaged to indicate connection of the components. However, such connection sounds can be difficult to hear, particularly in situations where the connected components are obscured by other parts of the assembly. For example, this is a common issue in the field of automotive manufacturing, where wire harnesses are often connected by hand around other parts within a partially assembled vehicle. This situation is exacerbated on a commercial production line because a technician may not be able to hear the connection sound due to background factory noises.

WO2017/0062124 attempts to address the above by providing a connector mating assurance system in the form a glove which is to be worn by a technician as they connect components together and which comprises one or more microphones for detecting connection sounds. In use, a component may be gripped by the gloved hand and then connected into the corresponding connection point. The one or more microphones on the glove are then used to sense the connection sound as the components are connected and determine if this matches a stored audio signature of a desired connection.

WO2017/0062124 recognises the issue of background noise being picked up by its microphones and proposes various filtering techniques to mitigate the effect of background noise. For example, in embodiments, WO2017/0062124 describes using a beam-forming technique on inputs from two or more microphones to filter out sounds determined to occur from a direction outside of the target direction. Using a separate microphone to detect background noise and subtract this from the primary microphone signals is also disclosed.

Conventional connector mating assurance systems, such as that disclosed in WO2017/0062124, have not however been widely adopted due to a lack of reliability. In particular, it has proved impractical to filter out background noise from an audible connection signal with any consistency. For instance, beam-forming directional filtering is only effective when the relative positions of the microphones in the sensor array and the position of the sensor array relative to the connectors are fixed. However, in real-world scenarios, a technician might grip each connector slightly differently, and there will also be differences between different technicians. As such, the relative positions are not fixed and in order to allow for the variances, the focusing of the array needs to be kept broad. This, in turn, means that this type of filtering offers limited signal improvement. Furthermore, other digital filtering involving noise subtraction often leads to significant degradation of the overall signal. That is, all of the source sounds making up an audio signal are typically reduced to some extent, including frequency components making up the target connection sound itself. Furthermore, whilst filtering may allow a signal encompassing the target connection sound to be extracted, it does not help to classify the connection based on the extracted signal. As such, conventional connector mating assurance systems have not been effective in commercial applications.

The present disclosure therefore seeks to address the above problems with the prior art.

SUMMARY

According to a first aspect, there is provided a device for verifying the connection of components by a gripper, wherein connecting two or more components produces a connection sound, the device comprising: a plurality of audio sensors; a fastener for securing the plurality of audio sensors at different positions on the gripper; and a controller comprising: an input for receiving the audio signals from the plurality of audio sensors; a neural network for isolating the connection sound from the audio signals received from the plurality of audio sensors using independent component analysis based on training audio data obtained from audio signals received during a plurality of training connections made in a controlled environment; and an output for indicating a desired connection status based on the isolated connection sound.

In this way, the device may be secured to a gripper used to hold a component as it is mated with a counterpart. The audio sensors, such as microphones or vibration sensors, are thereby located in the vicinity of the mating zone as two or more components are connected together, allowing them to detect sounds as the components connect. The neural network is then able to analyse these sounds, focusing in on the connection sound source and isolating this from background noise sources. The machine learning algorithm employed by the neural network thereby mimics the type of sound source separation employed by the human brain in the so-called "cocktail party effect" where a single voice is focused on in a noisy room. Importantly, unlike conventional digital filtering techniques which filter by effectively subtracting data from the received audio signals, the claimed analysis involves maximising the data being processed as part of the independent component analysis. This not only allows the fidelity of the detected connection sound to be maintained, but also means that the signal is independent of the geometry of the audio sensor array. That is, the algorithm may automatically adapt to changes in the sound scape resulting from different relative positions between the audio sensors. Embodiments may also provide artificial intelligence (AI) based signal classification in order to generate an output signal indicating whether a good or bad connection has been made.

In embodiments, the neural network applies the cocktail party algorithm. In this respect, this algorithm has been previously used in artificial intelligence research as a way to isolate individual human voices from background noise. Embodiments have therefore applied this algorithm in a new practical application to isolate connection sounds associated with the assembly of components.

In embodiments, the independent component analysis by the neural network comprises analysing the differences in phase delay and composition between the audio signals received from at least two of the plurality of audio sensors based on differences identified by the training audio data. In this way, the neural network is able to analyse patterns of commonality and differences between the signals received from two or more geometrically separated audio sensors in order to provide a binaural unmasking type effect.

In embodiments, the gripper is one of a user's hand or a robotic manipulator. As such, embodiments may be used in manual connection operations, as well as automated systems where a robotic arm replaces a human user.

In embodiments, the plurality of audio sensors comprise first and second audio sensors for location at first and second positions on the gripper when secured by the fastener, wherein said first and second positions are located such that, in use, both the first and second audio sensors simultaneously contact at least one of the two or more components when held by the gripper during their connection. In this way, audio signals transmitted as vibrations through the component itself may be detected directly by the physical contact with the first and second audio sensors. It will also be understood that, in embodiments, further audio sensors may be provided for simultaneously delivering further audio signals to the neural network. As such, different combinations of audio sensors may be used, with some being in direct physical contact, whilst others relying on transmission through the air. The neural network identifies the connection sound based on comparing the plurality of separate audio signals. Consequently, a greater number of audio sensors will typically provide an improved resolution of the connection sound, albeit that the number of audio signals that can be simultaneously analysed will be limited by the processing power of the neural network.

In embodiments, the neural network comprises further training audio data obtained from audio signals received during a different plurality of training connections made by connecting a different two or more components in a controlled environment. In this way, the same device may be used to verify the status of connections of different types of components, which may have a different connection sounds associated with them.

In embodiments, the output comprises an audio output for connection to a speaker for outputting the isolated connection sound. In this way, a user may be provided with an audible feedback of the connection they are making to allow them to assess the effectiveness of that connection based on an enhanced playback of the connection sound. In embodiments, the device may comprise headphones for outputting the isolated connection sound.

In embodiments, the controller further compares the isolated connection sound to a profile associated with a desired connection sound for identifying when the desired connection status has been made. In this way, the controller may automatically determine if an effective connection has been made. In embodiments, the signal classification may be performed by an artificial intelligence algorithm.

In embodiments, the output comprises a visual indicator. In this way, a user is alerted when a connection has been made.

In embodiments, the output further comprises an indicator for indicating a poor connection status based on the isolated connection sound. In this way, a user is alerted to when a connection is inadequate.

In embodiments, the device further comprises a storage for storing a log of the connection status of components connected by the user. In this way, the accuracy of a user or robotic system effecting the connections can be monitored.

In embodiments, the wearable fastener is a glove. As such, the embodiments may be provided as user-worn sensor unit configured to be worn on a user's hand. A user, such as a technician in an assembly plant, may therefore secure the device to their hand by putting on the glove, with the locations of the audio sensors being dictated by their position on the glove material.

In embodiments, the two or more components are electronic connectors. Embodiments are particularly suited for the connection of electronic connectors, such as cable harnesses. Such electronic connectors may comprise a plug having a plurality of pins (e.g. 80 or more) and a corresponding socket into which the plug is received.

According to a second aspect, there is provided a method for verifying the connection of components by a gripper, wherein connecting two or more components produces a connection sound, the method comprising the steps of: securing a plurality of audio sensors at different positions on the gripper using a fastener; receiving audio signals from the plurality of audio sensors to a controller input as the two or more components are connected using the gripper; isolating the connection sound from the audio signals received from the plurality of audio sensors by a neural network using independent component analysis based on training audio data obtained from audio signals received during a plurality of training connections made in a controlled environment; and outputting a signal indicating a desired connection status based on the isolated connection sound.

According to a third aspect, there is provided a method for training a device to verify the connection of components by a gripper, wherein connecting two or more components produces a connection sound, the method comprising the steps of: securing a plurality of audio sensors at different positions on the gripper using a fastener; establishing a first controlled environment in which ambient noise is minimised; performing a first sequence of training connections under the first controlled environment in which two or more components are connected to a desired connection status using the gripper; receiving audio signals from the plurality of audio sensors to a controller input during the first sequence of training connections; establishing a second controlled environment in which ambient noise corresponds to a usage environment; performing a second sequence of training connections under the second controlled environment in which two or more components are connected to a desired connection status using the gripper; receiving audio signals from the plurality of audio sensors to a controller input during the second sequence of training connections; processing, by a neural network, the audio signals received from the plurality of audio sensors during the first and second sequences of training connections using independent component analysis.

In embodiments, the training process may comprise collecting n audio signal samples for training connections under different conditions. The different conditions may include operations with and without noise, as well as exposure to different sound distortions and different connection scenarios (e.g. broken pins, low tension springs, and incorrect tension). Each audio signal sample may then be manually classified to designate it as achieving a desired connection status or resulting in an undesired connection status. The samples may then be split into two random groups, with the first group being used to train the neural network, and the second group being used to validate the training. Training is then continued until a required key performance indicator has been achieved, such as the connection classification accuracy being above a specified level.

BRIEF DESCRIPTION OF DRAWINGS

Illustrative embodiments will now be described, with reference to the accompanying drawing in which.

DETAILED DESCRIPTION

Figure 1:
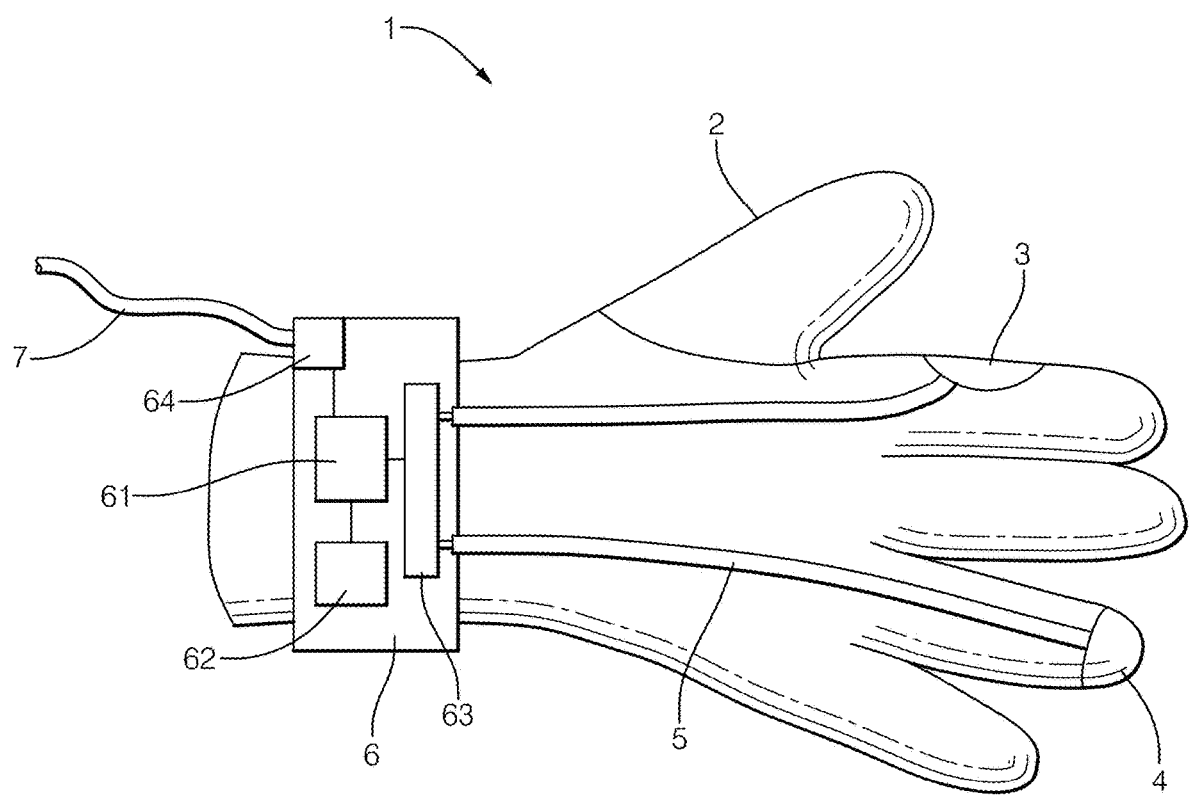
FIG. 1 shows a device according to a first embodiment.

FIG. 1 shows a connection assurance device 1 according to a first embodiment. This embodiment the device is provided in the form of a wearable glove 2 to be worn by a user, such as a technician or assembly line employee working in an assembly plant.

The glove 2 is provided with a controller 6 at the cuff of the device, which is connected through connecting wires 5 to a first microphone 3 and a second microphone 4. The first and second microphones 3, 4 are secured to the glove 2 at first and second locations, respectively. These locations are configured such that, when the user's gloved hand grips a component (not shown), the first and second microphones 3, 4 are brought into direct physical contact with the component. When the component is then fitted to its counterpart component, the sound vibrations from the connection are conducted through the component itself, as well as through the air. In other embodiments, other types of audio sensors may also be used, such as vibration sensors. Furthermore, more than two audio sensors may be provided and, whilst embodiments may have at least two of these in direct contact with the component, one or more of the audio sensors may be located such that they are distanced from the component in use.

In this embodiment, the controller 6 is provided as a processor assembly comprising a microprocessor 61, a memory 62 accessible by the microprocessor 61, and an input interface 63 for receiving signals from the microphones 3, 4 via wires 5 and output interface 64 for outputting a signal via on audio output 7.

The controller 6 is used to process audio signals from the microphones 3, 4 using a neural network stored in the controller's memory 63 and executed by the controller's microprocessor 61. The neural network applies the cocktail party algorithm to perform independent component analysis on the received signals.

The audio output 7 is connected to the controller 6 and provides audio feed for a set of headphones (not shown) worn by the user.

Prior to its commercial use, the device's neural network is trained by performing a plurality of training connection operations under different controlled conditions. For each training connection, a user will grip one component in their gloved hand and perform an operation where the component is engaged with its counterpart. As such, the user's hand functions as a gripper for holding one of the components as the connection operation is performed. The connection operations are also repeated under different sound scape conditions to expose the neural network to the audio signals generated both with and without the presence of background noise. In embodiments, training is also performed with different levels and types of background noise. For example, operations may be conducted both in the presence of isolated sample background noises, as well as in a simulated operating factory environment and faults.

The controller's neural network applies independent component analysis to the audio signals delivered to it. That is, as the first and second microphones 3, 4 are in different positions, the audio signals generated by each will be composed of different proportions and phase delays of the same sounds, depending on the relative positions of each microphone to the respective sources of each of those components. For instance, if the first microphone 3 is relatively closer to an audible indicator mechanism provided on the component being connected, the audio indicator sound will be received sooner and more loudly by that microphone. Conversely, the second microphone 4 will also receive the audio indicator sound, but later and at a lower volume, with background noise making up a relatively higher proportion of the signal signature it receives. Through training, the neural network is therefore able to use the cocktail party algorithm to perform independent component analysis in order to isolate the connection sound from the background noise based on the differences in phase delay and signal composition between the plurality of received audio signals.

Once trained, the controller 6 is able to analyse incoming audio signals to isolate the components making up the connection sound from other sound components making up the background noise. In use, the isolated connection sound is then outputted through the audio output 7 to the headphones, thereby allowing a user to determine whether the components have been successfully connected in the desired way.

In commercial use scenarios, a user will wear the device 1 on their hand, along with a set of headphones connected to output 7. As the user performs real-world connection operations, the controller 6 will process incoming audio signals from the plurality of audio sensors and output the isolated connection sound from the remaining background noise. The user is thereby provided with audible feedback through the headphones, which allows them to determine when a connection between the components has been successfully made. In this way, a user is able to ensure components, such as a wire harness, are correctly connected, even on a noisy factory production line.

Figure 2:
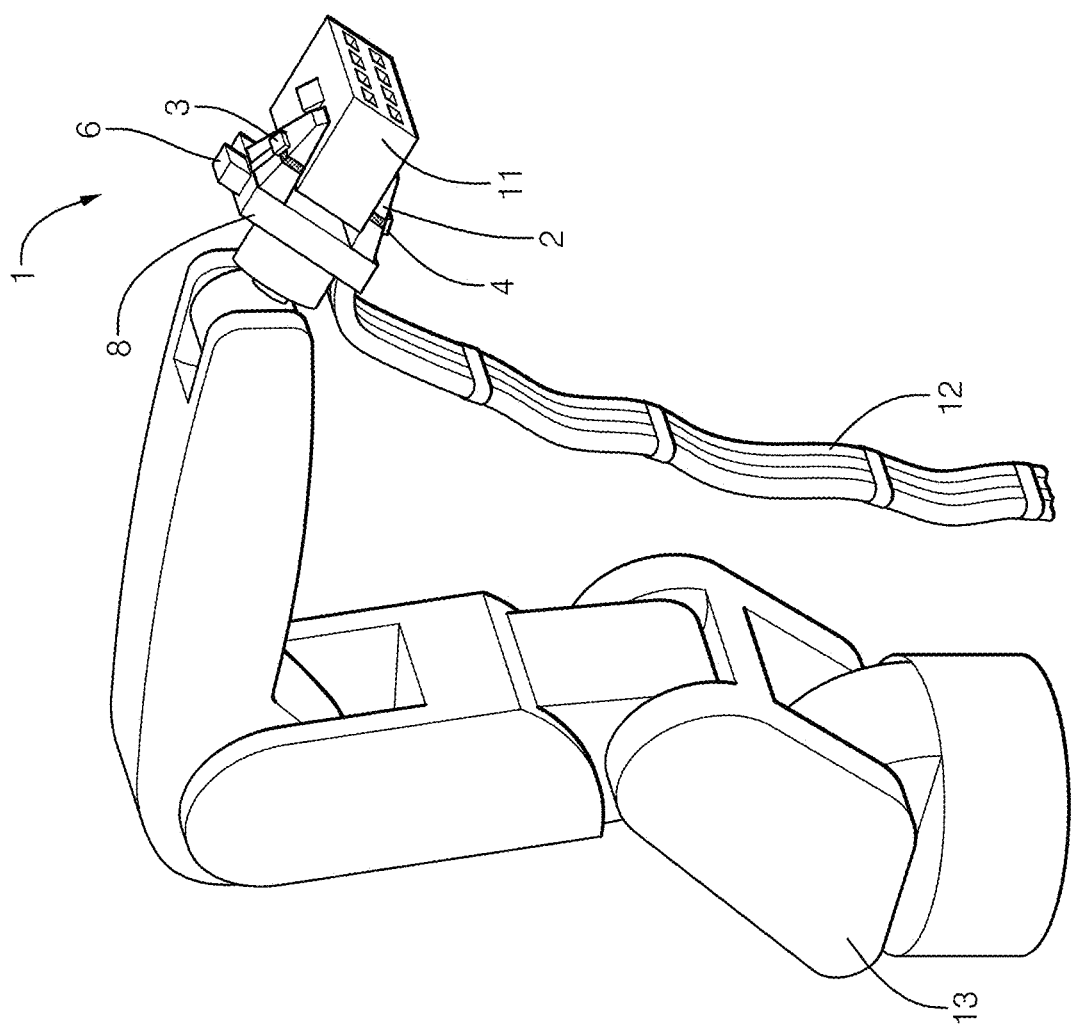
FIG. 2 shows a device according to a second embodiment.

FIG. 2 shows a connection assurance device 1 according to a second embodiment. In this embodiment, the device 1 is provided in the form of an attachable harness 2 (similar to the glove 2 in FIG. 1) to be fitted to a gripper 8 provided on the distal end of the arm of a production line robot 13.

The device 1 is provided with first and second microphones 3, 4 that are respectively secured to each finger of the gripper 8 using the attachable harness 2 (e.g., fixture straps). The first and second microphones 3, 4 are connected to the controller 6 by wires 5.

FIG. 2 further shows the gripper 8 holding the terminal connector 11 of a wire harness for connection into connection port or socket 10 provided in assembly 9. The terminal connector 11 is fed by a bound trunk of cables 12, and the top panel of the connector's housing comprises a latch which engages into a recess formed in the housing of the connection socket 10. The connection socket 10 comprises a plurality of pins which are received into apertures provided in the terminal connector 11. When the terminal connector 11 is correctly inserted into the connection socket 10, the pins engage into the apertures, and the latch engages into the recess to release an audible "click". This confirms the pins are sufficiently inserted to establish an electrical connection with the wire harness. In use, the production line robot 13 is programmed to perform repeated connection operations by inserting the terminal connector 11 into connection socket 10.

In this embodiment, the training phase similarly involves the neural network being exposed to a plurality of training connection operations under different controlled conditions. However, in addition, the training phase further comprises connection operations resulting in different connections statuses. Specifically, operations resulting in successful connections, in which the components are mated together in the desired way, are recorded as this. Conversely, operations resulting in unsuccessful connections, in which the components are not correctly fitted together, are also recorded, along with instances of partial connection.

In use, the controller 6 in this embodiment performs similar independent component analysis to the audio signals using the neural network as described in the first embodiment. However, additionally, in this embodiment, the controller 6 is also able to categorise the status of the connection based on different connection sounds. That is, the system is able to determine, based on the received sounds whether a desired connection has been achieved, rather than merely a partial or unsuccessful connection.

The connection status data is outputted by controller 6 using a feedback mechanism to verify the robot is operating correctly. For example, assemblies which have been identified as having only partial connections with the cable harness may be manually checked and corrected, before further assembly operations take place.

The controller 6 may further comprise a memory for logging each connection. In this way, the device according to the second embodiment allows the robot's accuracy to be monitored over time in order to identify, for example, when maintenance is necessary.

Embodiments are therefore able to provide an indication of whether a desired connection status has been achieved when two components are connected, even in instances where there are high levels of background noise. This thereby allows instances where two components may not have been successfully connected to be identified early, before subsequent assembly operations occur. Consequently, embodiments are particularly advantageous on assembly production lines, where connection faults may not otherwise be detectable until the product has been completely assembled.

It will be understood that the embodiments illustrated above show applications only for the purposes of illustration. In practice, embodiments may be applied in many different configurations, the detail of which being straightforward for those skilled in the art to implement.

For example, although the above user operated embodiment shown in FIG. 1 employs an audible feedback via headphones, in other embodiments a visual indicator may be provided. For example, a light-emitting diode (LED) display may be used to indicate that a desired connection status has been achieved. Furthermore, the status of a connection may also be identified visually, for example to alert the user to instances where a partial or unsuccessful connection has been made.

Furthermore, although in the above embodiments the processing takes place locally, it will be understood that in other embodiments, the controller 6 may employ distributed processing and transmit the audio signal data to an eternal processing resource, such as a server. In such embodiments, the local controller 6 components may comprise, for example, a Wi-Fi transceiver for communication with the server through a wireless access point.

What is claimed is:

1. A device for verifying a connection of components connected by a gripper, the device comprising:
   a plurality of audio sensors configured to generate audio signals in response to detecting sounds, the sounds including background noise and a connection sound produced by two or more components being connected together;
   a fastener configured to secure the plurality of audio sensors at different positions on the gripper; and
   a controller comprising:
      a controller input configured to receive the audio signals from the plurality of audio sensors;
      a neural network configured to isolate the connection sound from the background noise in the audio signals received from the plurality of audio sensors using independent component analysis that is independent of relative positions of the plurality of audio sensors to each other and to the two or more components and is based on training audio data obtained from audio signals received during a plurality of training connections made in a controlled environment, wherein the independent component analysis by the neural network comprises an analysis of differences in phase delay and composition between the audio signals received from at least two of the plurality of audio sensors based on differences identified by the training audio data; and
      an output interface configured to indicate that a desired connection status has been achieved based on the isolated connection sound.

2. The device according to claim 1, wherein the neural network applies a cocktail party algorithm to isolate individual human voices from the background noise.

3. The device according to claim 1, wherein the gripper is one of a user's hand or a robotic manipulator.

4. The device according to claim 1, wherein:
   the plurality of audio sensors comprises first and second audio sensors located at first and second positions on the gripper when secured by the fastener; and
   the first and second positions are located such that, in use, both the first and second audio sensors simultaneously contact at least one of the two or more components when held by the gripper during their connection.

5. The device according to claim 1, wherein the neural network comprises further training audio data obtained from audio signals received during a different plurality of training connections made by connecting a different two or more components in a controlled environment.

6. The device according to claim 1, wherein the output interface comprises an audio output for connection to a speaker for outputting the isolated connection sound.

7. The device according to claim 1, wherein the controller is further configured to compare the isolated connection sound to a profile associated with a desired connection sound for identifying when the desired connection status has been achieved.

8. The device according to claim 1, wherein the output interface comprises a visual indicator.

9. The device according to claim 1, wherein the output interface comprises an indicator for indicating a poor connection status based on the isolated connection sound.

10. The device according to claim 1, further comprising a storage for storing a log of the connection status of components connected by a user.

11. The device according to claim 1, wherein the fastener is a glove that is wearable by a user's hand.

12. The device according to claim 1, wherein the two or more components are electronic connectors.

13. A method for verifying a connection of components connected by a gripper, the method comprising:
   securing a plurality of audio sensors at different positions on the gripper using a fastener, the audio sensors configured to generate audio signals based on background noise and a connection sound produced by two or more components being connected together;
   receiving the audio signals from the plurality of audio sensors to a controller input as the two or more components are connected using the gripper;
   isolating the connection sound from the background noise in the audio signals received from the plurality of audio sensors by a neural network using independent component analysis that is independent of relative positions of the plurality of audio sensors to each other and to the two or more components and is based on training audio data obtained from audio signals received during a plurality of training connections made in a controlled environment, wherein using the independent component analysis by the neural network comprises analysing differences in phase delay and composition between the audio signals received from at least two of the plurality of audio sensors based on differences identified by the training audio data; and
   outputting a signal indicating that a desired connection status has been achieved based on the isolated connection sound.

14. The method according to claim 13, wherein the isolating of the connection sound includes isolating individual human voices from the ambient noise.

15. The method according to claim 13, further comprising comparing the isolated connection sound to a profile associated with a desired connection sound for identifying when the desired connection status has been achieved.

16. A method for training a device to verify a connection of components connected by a gripper, the method comprising:
   securing a plurality of audio sensors at different positions on the gripper using a fastener;
   establishing a first controlled environment with low ambient noise;
   performing a first sequence of training connections under the first controlled environment in which two or more components are connected to a desired connection status using the gripper, wherein connecting the two or more components produces a connection sound;
   receiving first audio signals from the plurality of audio sensors to a controller input during the first sequence of training connections;
   establishing a second controlled environment in which ambient noise corresponds to a usage environment;
   performing a second sequence of training connections under the second controlled environment in which two or more components are connected to a desired connection status using the gripper;
   receiving second audio signals from the plurality of audio sensors to a controller input during the second sequence of training connections; and
   processing, by a neural network, the first and second audio signals received from the plurality of audio sensors during the first and second sequences of training connections, respectively, using independent component analysis, wherein the processing, by the neural network, of the first and second audio signals includes isolating the connection sound from the ambient noise based on differences in phase delay and signal composition between audio signals in the first and second audio signals to produce training audio data.

17. The method according to claim 16, wherein the differences in phase delay and signal composition between the audio signals in the first and second audio signals are dependent on relative positions of each controller input to respective sources of each connection sound.

* * * * *